United States Patent
Bickford et al.

(10) Patent No.: US 9,767,240 B2
(45) Date of Patent: Sep. 19, 2017

(54) TEMPERATURE-AWARE INTEGRATED CIRCUIT DESIGN METHODS AND SYSTEMS

(71) Applicant: GlobalFoundries Inc., Grand Cayman (KY)

(72) Inventors: Jeanne P. Bickford, Essex Junction, VT (US); Alok Chandra, Bangalore (IN); Anand Kumaraswamy, Bangalore (IN); Sandeep Prajapati, Bangalore (IN); Venkatasreekanth Prudvi, Bangalore (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 71 days.

(21) Appl. No.: 14/945,530

(22) Filed: Nov. 19, 2015

(65) Prior Publication Data

US 2017/0147727 A1    May 25, 2017

(51) Int. Cl.
*G06F 17/50*    (2006.01)

(52) U.S. Cl.
CPC ...... *G06F 17/5045* (2013.01); *G06F 17/5072* (2013.01); *G06F 17/5081* (2013.01);
(Continued)

(58) Field of Classification Search
CPC .. G06F 17/50; G06F 17/5045; G06F 17/5068; G06F 17/5072; G06F 17/5077; G06F 2217/78; G06F 2217/80
(Continued)

(56) References Cited

U.S. PATENT DOCUMENTS 5,764,533 A * 6/1998 deDood ............. H01L 27/0207
                                                        257/204
6,446,245 B1   9/2002 Xing et al.
(Continued)

FOREIGN PATENT DOCUMENTS

WO    2012018571 A1    2/2012

OTHER PUBLICATIONS

Yao et al., "An Efficient Power Routing Technique to Resolve the Current Crowding Effect in the Power Grid Structure of Gate Arrays", ASIC Conference and Exhibit, 1994, Proceedings, Seventh Annual IEEE International, Abstract.
(Continued)

*Primary Examiner* — Stacy Whitmore
(74) *Attorney, Agent, or Firm* — Gibb & Riley, LLC; David A. Cain, Esq.

(57) ABSTRACT

Disclosed are temperature-aware integrated circuit (IC) design methods and systems, which establish a customized power delivery network (PDN) for an IC early in the design process in order to generate, in a timely manner, a final IC design layout that can be used to manufacture IC chips that will exhibit minimal hotspots. Specifically, prior to placement of library elements, an initial PDN is established and divided into sections. The library elements are placed. Then, potential hotspots associated with any of the sections are identified and a customized PDN for the IC is established to eliminate the hotspots. That is, for each section, a total power consumption amount is determined. When the total power consumption amount is greater than the threshold, a hotspot is indicated and the section is customized to eliminate the hotspot. Also disclosed is a resulting IC chip structure.

16 Claims, 10 Drawing Sheets

(52) U.S. Cl.
CPC .......... *G06F 17/50* (2013.01); *G06F 17/5068* (2013.01); *G06F 17/5077* (2013.01); *G06F 2217/78* (2013.01); *G06F 2217/80* (2013.01)

(58) Field of Classification Search
USPC ................ 716/100–101, 106, 109–112, 127, 716/132–133, 130
See application file for complete search history.

(56) References Cited

U.S. PATENT DOCUMENTS

| | | | | |
|---|---|---|---|---|
| 6,578,176 | B1* | 6/2003 | Wang | G06F 17/5045 706/13 |
| 6,622,294 | B2 | 9/2003 | Saxena et al. | |
| 6,868,374 | B1* | 3/2005 | Ditlow | G06F 17/5036 703/18 |
| 7,007,257 | B2 | 2/2006 | Tanaka | |
| 7,373,629 | B2* | 5/2008 | McGrath | H01L 27/0207 257/E27.11 |
| 7,757,103 | B2* | 7/2010 | Savransky | G06F 1/206 713/300 |
| 8,028,259 | B2 | 9/2011 | Phan Vogel | |
| 8,914,765 | B2 | 12/2014 | Sigal et al. | |
| 8,963,620 | B2 | 2/2015 | Bickford et al. | |
| 2004/0030511 | A1* | 2/2004 | Tien | G06F 17/5036 702/60 |
| 2004/0268277 | A1* | 12/2004 | Francom | G06F 17/5036 716/111 |
| 2007/0244676 | A1* | 10/2007 | Shang | G06F 17/5018 703/2 |
| 2008/0026493 | A1* | 1/2008 | Shakouri | G06Q 10/04 438/17 |
| 2008/0028244 | A1* | 1/2008 | Capps | G06F 1/206 713/324 |
| 2008/0098340 | A1* | 4/2008 | Oh | G06F 17/5072 716/111 |
| 2009/0024347 | A1* | 1/2009 | Chandra | G06F 17/5036 702/130 |
| 2009/0177445 | A1* | 7/2009 | Capps, Jr. | G06F 1/206 703/1 |
| 2009/0224356 | A1* | 9/2009 | Chandra | G06F 17/5009 257/499 |
| 2011/0248318 | A1* | 10/2011 | Herbst | A61N 1/32 257/208 |
| 2012/0102448 | A1* | 4/2012 | Haugestuen | G06F 17/5036 716/134 |
| 2013/0238300 | A1* | 9/2013 | Ozawa | G06F 17/5036 703/2 |
| 2013/0298101 | A1* | 11/2013 | Chandra | G06F 17/50 716/136 |
| 2015/0006142 | A1* | 1/2015 | Dhanwada | G06F 17/5036 703/21 |
| 2015/0227668 | A1* | 8/2015 | Liu | G06F 17/5077 716/130 |
| 2015/0302128 | A1* | 10/2015 | Katta | G06F 17/5072 716/120 |
| 2015/0347665 | A1* | 12/2015 | Sapatnekar | G06F 17/5081 716/115 |

OTHER PUBLICATIONS

Yim et al., "A Floorplan-Based Planning Methodology for Power and Clock Distribution in ASICs [CMOS Technology]", Design Automation Conference, 1999, Proceedings, 36th, Abstract.
Boyd et al., "Design of Robust Global Power and Ground Networks", ACM 1-58113-347-2/01/0004, 2001, pp. 1-6.
Chowdhury et al., "Optimum Design of Reliable IC Power Networks Having General Graph Topologies", Design Automation, 1989, IEEE 26th Conference, Abstract.
Chowdhury et al., "The Construction of Minimal Area Power and Ground Nets for VLSI Circuits", Design Automation, 1985, IEEE 22nd Conference, Abstract.
Dharchoudhury et al., "Design and Analysis of Power Distribution Networks in PowerPC/sup TM/ Microprocessors", Design Automation Conference, 1998, IEEE Proceedings, Abstract.
Mitsuhashi et al., "Power and Ground Network Topology Optimization", 29th ACM/IEEE Design Automation Conference, 1992, pp. 524-529.
Su et al., "Fast Analysis and Optimization of Power/Ground Networks", Computer Aided Design, 2000, ICCAD-2000. IEEE/ACM International Conference, Abstract.
Tan et al., "Reliability-Constrained Area Optimization of VLSI Power/Ground Networks Via Sequence of Linear Programming", IEEE Trans. on Computer-Aided Design of Integrated Circuits and Systems, 1999, pp. 1-6.
Wang et al., "Optimization of the Power/Ground Network Wire-Sizing and Spacing Based on Sequential Network Simplex Algorithm", Quality Electronic Design, 2002, Proceedings. International Symposium, 2002, Abstract.
Wang et al, "Power/Ground Mesh Area Optimization Using Multigrid-Based Technique", IEEE Design Automation and Test in Europe Conference and Exhibition, 2003, pp. 1-6.
Wu et al., "Area Minimization of Power Distribution Network Using Efficient Nonlinear Programming Techniques", Computer-Aided Design of Integrated Circuits and Systems, IEEE Transactions, vol. 23, Issue 7, 2004, pp. 1-5.

\* cited by examiner

TEMPERATURE-AWARE INTEGRATED CIRCUIT DESIGN METHODS AND SYSTEMS

FIELD OF THE INVENTION

The present invention relates to integrated circuit (IC) design and, more particularly, to temperature-aware IC design methods, systems and computer program products.

BACKGROUND

Hotspots are becoming more and more problematic with newer IC technologies. For purposes of this disclosure, a hotspot refers to a specific area on an IC chip that exhibits a relatively high operating temperature as compared to the normal operating temperature range exhibited across the IC chip. Hotspot development in newer IC technologies is generally understood to be the result of semiconductor device scaling that has lead to an increase in semiconductor device density (i.e., an increase in the number of semiconductor devices per unit area on an IC chip) and also the result of the high switching frequencies. When the number and/or switching frequency of power generating semiconductor devices within a specific area of an IC chip are relatively high, then the operating temperature associated with that specific area would also be relatively high. Hotspots are problematic because temperature-dependent increases in electromigration (EM) and voltage drops (also referred to in the art as IR drops) that occur in such areas can create reliability and functionality issues. Therefore, there is a need in the art for improved temperature-aware design methods and systems.

SUMMARY

In view of the foregoing, disclosed herein are temperature-aware integrated circuit (IC) design methods, systems and computer program products, which establish a customized power delivery network (PDN) for an IC early in the design process in order to generate, in a timely manner, a final IC design layout that can be used to manufacture IC chips that will exhibit minimal hotspots for improved IC reliability and functionality. Specifically, during design and prior to placement of library elements, an initial PDN can be established and divided into multiple essentially identical sections. The library elements can then be placed relative to the sections. Next, potential hotspots associated with any of the sections can be identified and a customized PDN for the IC can be established to eliminate the hotspots. That is, for each section, a total power consumption amount can be determined and compared to a per section total power consumption threshold. When the total power consumption amount associated with the sections is greater than the threshold, a hotspot is indicated. In this case, the section can be customized to handle additional current in that section (i.e., to limit temperature increases due to a relatively high total power consumption amount in that section), eliminating the hotspot and, thereby avoiding any EM or voltage drop issues within the section. Also disclosed is a resulting IC chip structure.

More particularly, disclosed herein are temperature-aware integrated circuit (IC) design methods. In each method, design specifications for an IC can be accessed from a memory. Based on the design specifications, an initial power delivery network (PDN) for the integrated circuit can be established. Additionally, library elements for the IC can be selected. The initial PDN can be divided, for purposes of design, into multiple sections each having the same specific size. Given this specific size, a per section total power consumption threshold can be defined. Then, placement of the library elements can be established relative to the multiple sections of the initial PDN. Following placement of the library elements, a customized power delivery network for the IC can be established to avoid any potential hotspots. Specifically, the customized PDN can be established by first determining a total power consumption amount for each section and then comparing that total power consumption to the per section total power consumption threshold. When the total power consumption amount for the section is greater than the per section total power consumption threshold, a hotspot is indicated and the section is customized in order to handle the additional current in that section (i.e., to limit temperature increases due to a relatively high total power consumption amount in that section), eliminate the potential hotspot and, thereby avoid any EM or voltage drop issues within that section.

Also disclosed herein are temperature-aware integrated circuit (IC) design systems. Each system incorporates a memory and at least one processor in communication with the memory. The memory can store design specifications for an IC. Based on the design specifications, the processor can establish an initial power delivery network (PDN) for the integrated circuit and select library elements for the IC. The processor can divide the initial PDN, for purposes of design, into multiple sections each having the same specific size. Given this specific size, the processor can define a per section total power consumption threshold. Then, the processor can establish placement of the library elements relative to the multiple sections of the initial PDN. Following placement of the library elements, the processor can establish a customized power delivery network to avoid any potential hotspots. Specifically, the processor can establish the customized PDN by first determining a total power consumption amount for each section and then comparing that total power consumption to the per section total power consumption threshold. When the total power consumption amount for the section is greater than the per section total power consumption threshold, a hotspot is indicated and the processor can customize the section in order to handle additional current in that section (i.e., to limit temperature increases due to a relatively high total power consumption amount in that section), eliminate the potential hotspot and, thereby avoid any EM or voltage drop issues within that section.

Also disclosed herein is a computer program product for temperature-aware integrated circuit (IC) design. The computer program product can be a computer readable storage medium with program instructions embodied therewith (e.g., stored thereon). These program instructions can be executable by a processor to cause the processor to perform the above-described integrated circuit design method.

Also disclosed herein is an IC chip structure manufactured according to a final IC design layout generated and output using the methods, systems or computer program products. Specifically, the IC chip can have a power delivery network and devices, which are electrically connected to the power delivery network and which are associated with various library elements placed, as described above. The PDN can be a customized PDN network having multiple sections, each with the same specific size. The multiple sections can include both first sections and at least one second section (i.e., at least one customized section). The first sections can be essentially identical. For example, the first sections can have the same number of power rails and those power rails can each have the same width. Each second section can be uniquely different from the first sections and, particularly, can be customized to compensate for factors that could lead to an undesirable amount of power consumption and, thereby a hotspot. Specifically, each second section can be customized such that operating temperatures across the power deliver network remain less than a predetermined threshold temperature.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

Figure 1:
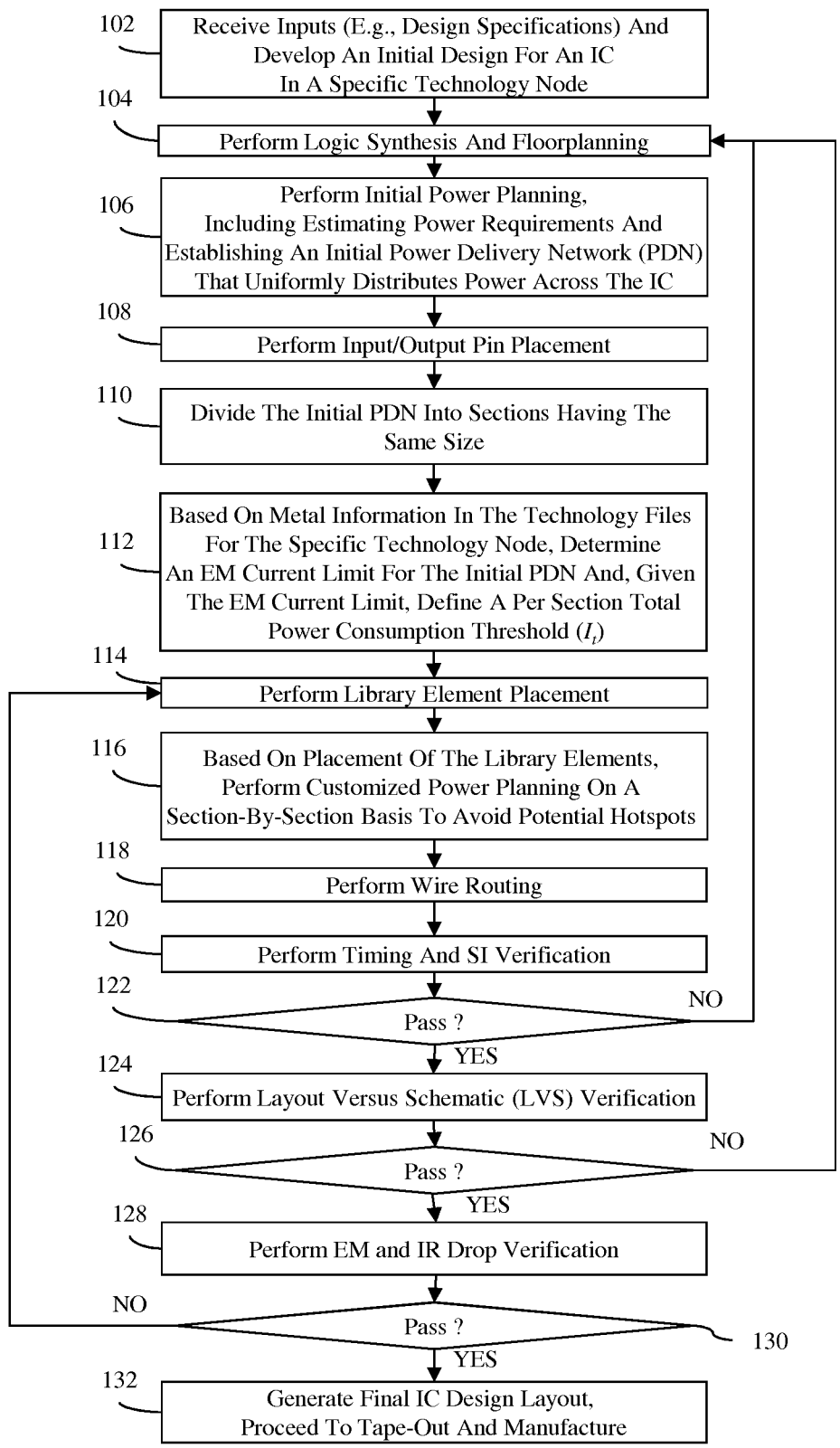
FIG. 1 is a flow diagram illustrating a temperature-aware integrated circuit (IC) design method.

As mentioned above, hotspots are becoming more and more problematic with newer IC technologies. For purposes of this disclosure, a hotspot refers to a specific area on an IC chip that exhibits a relatively high operating temperature as compared to the normal operating temperature range exhibited across the IC chip. Hotspot development in newer IC technologies is generally understood to be the result of semiconductor device scaling that has lead to an increase in semiconductor device density (i.e., an increase in the number of semiconductor devices per unit area on an IC chip) and also the result of the high switching frequencies. When the number and/or switching frequency of power generating semiconductor devices within a specific area of an IC chip are relatively high, then the operating temperature associated with that specific area would also be relatively high. Hotspots are problematic because temperature-dependent increases in electromigration (EM) and voltage drops (also referred to in the art as IR drops) that occur in such areas can create reliability and functionality issues. For example, EM is generally understood to be the movement of metal ions due to an electric field. This movement of metal ions can cause voids within and/or shorts between the wires and vias that make up the various interconnect networks, including the power delivery network (also referred to as the power bus), on an IC. These voids and shorts are referred to collectively as EM fails, which can impact chip reliability and functionality.

Current IC design systems and methods typically perform the following processes in sequence: floorplanning, power planning, input/output (I/O) pin placement, library element placement, clock distribution network (e.g., clock tree) synthesis, wire routing, timing and signal integrity verification, physical verification to check the correctness of the layout of the design, and electromigration (EM) and voltage drop (also referred to in the art as IR drop) verification. Thus, EM and IR drop verification occurs late in the design process (e.g., after the physical verification process and just prior to tape out). However, if, during EM and IR drop verification, it is determined that EM and IR drop verification requirements are not met, the IC design must be completely reworked and, specifically, the processes of power planning, I/O pin placement, library element placement, clock distribution network (e.g., clock tree) synthesis, wire routing, timing and signal integrity verification, physical verification and EM and IR drop verification must be iteratively repeated. Completely reworking the IC design in this manner adds a significant amount of time to the IC design process.

In view of the foregoing, disclosed herein are temperature-aware integrated circuit (IC) design methods, systems and computer program products, which establish a customized power delivery network (PDN) for an IC early in the design process in order to generate, in a timely manner, a final IC design layout that can be used to manufacture IC chips that will exhibit minimal hotspots for improved IC reliability and functionality. Specifically, during design and prior to placement of library elements, an initial PDN can be established and divided into multiple essentially identical sections. The library elements can then be placed relative to the sections. Next, potential hotspots associated with any of the sections can be identified and a customized PDN for the IC can be established to eliminate the hotspots. That is, for each section, a total power consumption amount can be determined and compared to a per section total power consumption threshold. When the total power consumption amount associated with the sections is greater than the threshold, a hotspot is indicated. In this case, the section can be customized to handle additional current in that section (i.e., to limit temperature increases due to a relatively high total power consumption amount in that section), eliminating the hotspot and, thereby avoiding any EM or voltage drop issues within the section. Also disclosed is a resulting IC chip structure.

More particularly, referring to the flow diagram of FIG. 1, disclosed herein are temperature-aware integrated circuit (IC) design methods. The methods can be implemented using design information, for example, in the form of a process design kit (PDK), which is stored in a memory and which is accessible by one or more processors of a design system executing electronic design automation (EDA) tools on a computer-aided design (CAD) system for the purpose of designing an integrated circuit. The design information (e.g., the PDK) can include a set of foundry-specific files including, but not limited to, technology files for a specific technology node, a library element library, design rules, etc.

Those skilled in the art will recognize that a specific "technology node", which is also referred to as a specific "process node," is typically identified in nanometers (e.g., a 45 nm, 32 nm, 22 nm, etc.), thereby indicating the size of the semiconductor features that can be formed on a wafer. The technology node may also indicate the type of wafer, such as a silicon-on-insulator (SOI) wafer (e.g., 45 nm SOI, 32 nm SOI, 22 nm SOI, etc.).

The technology files can define the layers and devices that are available for a particular fabrication process as well as the generic physical and electrical rules for the specific technology node. For example, the technology files can contain generic EM-relevant information about metal layers used in the specific technology node and, particularly, can specify the attributes of the metal layers used in the specific technology node (e.g., the wire material, wire width, wire thickness, wire length, etc.).

The library element library can list multiple different library elements that can be incorporated into an IC under design in the specific technology node and, specifically, can contain library files (.libs) for each of those library elements. The library elements can be, for example, standard cells. Those skilled in the art will recognize that a standard cell typically includes a group of one or more transistors and the interconnect structure(s) that connect those transistors and can provide a logic function or a storage function. The library elements can also be standard blocks for memories, core processors, etc. In any case, the library files (.libs) can contain library information about the library elements, respectively, and this library information can include, but is not limited to, the specific attributes of the library element (e.g., the transistors, interconnects, etc.), the pin characteristics (e.g., capacitance, timing, etc.) for the library element, the timing information for the library element (e.g., a delay model), and other library element-specific information. This library element-specific information can include, but is not limited to, the widths of various threshold voltage (VT)-type transistors (e.g., for regular threshold voltage (RVT) transistors, high threshold voltage (HVT) transistors, mezzanine threshold voltage (MVT) transistors, super-high threshold voltage (SHVT) transistors, low threshold voltage (LVT) transistors, ultra-high threshold voltage (UHVT) transistors, etc.) in the library element as well as leakage models for those various threshold voltage (VT)-type transistors. Those skilled in the art will recognize that these leakage models can indicate how the different VT-type transistor will vary as a function of changes in voltage and temperature.

The design rules can include rule decks (also referred to as sets of rules or run sets) for one or more of the particular processes (e.g., an initial power planning rule deck, an input/output pin placement rule deck, a library element placement rule deck, a customized power planning rule deck, and a wire routing rule deck) in the design flow. These rule decks can be foundry-specific.

In the methods, the technology files, design specifications and library files can be accessed from memory and used early in the design process in order to, in a timely manner, generate and store a final IC design layout that can be used to manufacture IC chips that will exhibit minimal hotspots for improved IC reliability. Specifically, in the methods, design inputs for an IC in a specific technology node (e.g., design specifications) can be received (e.g., by a processor from a designer via a graphic user interface (GUI)). The design specifications can be stored in memory and an initial design for the IC can be developed based on the design specification (102). This initial design can be represented by a high-level description, which sets out the requirements for the IC chip. This high-level description can be stored in memory (e.g., on a data storage device) in, for example, a hardware description language (HDL), such as VHDL or Verilog. Those skilled in the art will recognize that this high-level description will set out specifications for various parameters (e.g., for channel length, channel width, doping, spacer width, etc.).

Following development of the initial design, logic synthesis and floorplanning can be performed (104). Specifically, during logic synthesis, the high-level description can be synthesized into a gate-level netlist, which describes the connectivity of the IC in terms of nets. Each net is listed in the netlist and is a conductor that interconnects two or more component terminals. In library element-based design, the high-level description can be synthesized into the netlist using library elements selected from the library element library. During floorplanning, the size of the IC chip, the placement of customized functional blocks, the placement of the area(s) for library elements, etc. can be determined.

Figure 2:
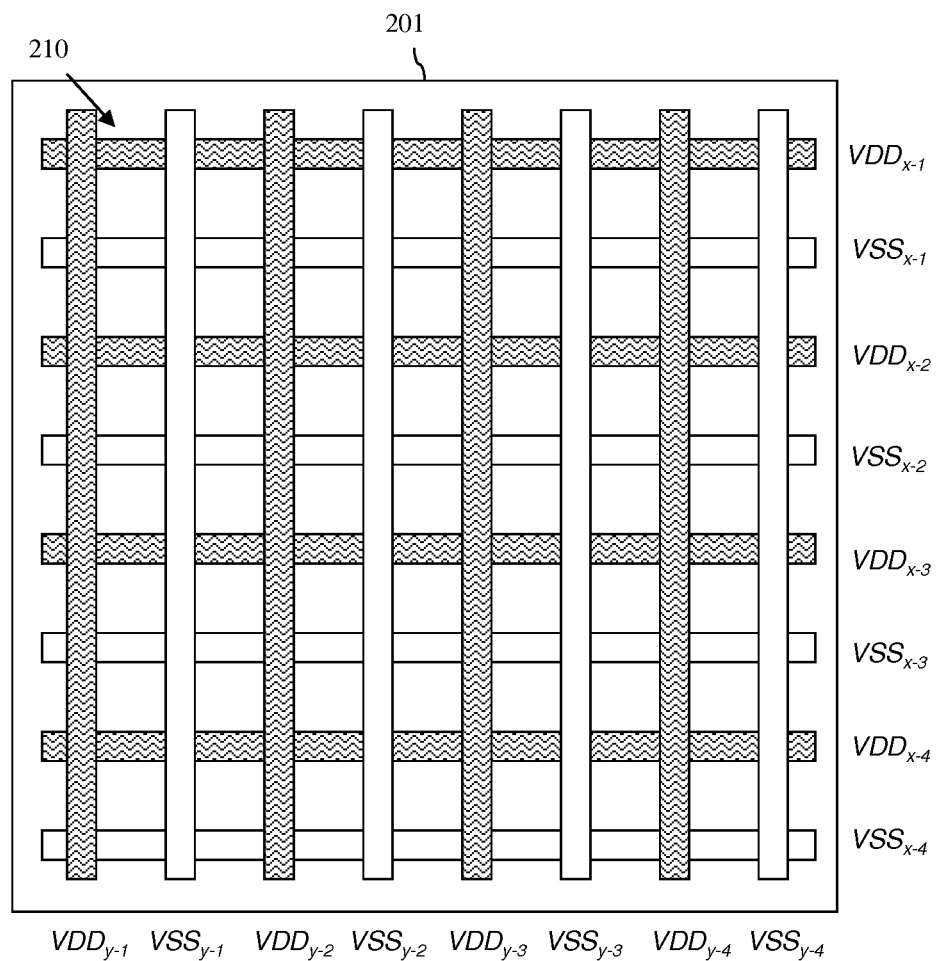
FIG. 2 is a top view diagram illustrating an exemplary initial power delivery network (PDN) established at process 106 of FIG. 1 for uniformly distributing power across the IC.

Then, initial power planning for the IC can then be performed (106). Specifically, during initial power planning, the power requirements for the IC can be estimated (e.g., based on the design specifications) and an initial power delivery network (PDN) (also referred herein as a power bus or grid) for the IC can be established for the IC based on the power requirements, the floorplan, and on information contained in the technology files regarding the metal layers used in the specific technology node (e.g., the wire material, wire width, wire thickness, wire length, etc.). As shown in FIG. 2, this initial PDN 210 can be a uniform PDN with power rails arranged for uniformly distributing power across the IC 201. Specifically, the initial PDN 210 can incorporate uniformly spaced power rails having the same width and arranged in a pattern with alternating positive power supply (VDD) and ground (VSS) power rails (i.e. alternating wires electrically connected to VDD and VSS) running in a first direction (e.g., the x-direction) across the full width of the IC 201 and overlaying or overlaid by alternating VDD and VSS power rails running in a second direction (e.g., the y-direction) across the full length of the IC 201.

Following initial power planning at process 106, input/output (I/O) pin placement can be performed (108). Specifically, the I/O pads and buffers can be placed based on the floorplan and the design of the initial PDN. Such I/O pin placement can, for example, be performed according an I/O pin placement rule deck. Techniques for I/O pin placement are well known in the art. Thus, the details of the I/O pin placement process are omitted from this specification in order to allow the reader to focus on the salient aspects of the disclosed method.

Figure 3:
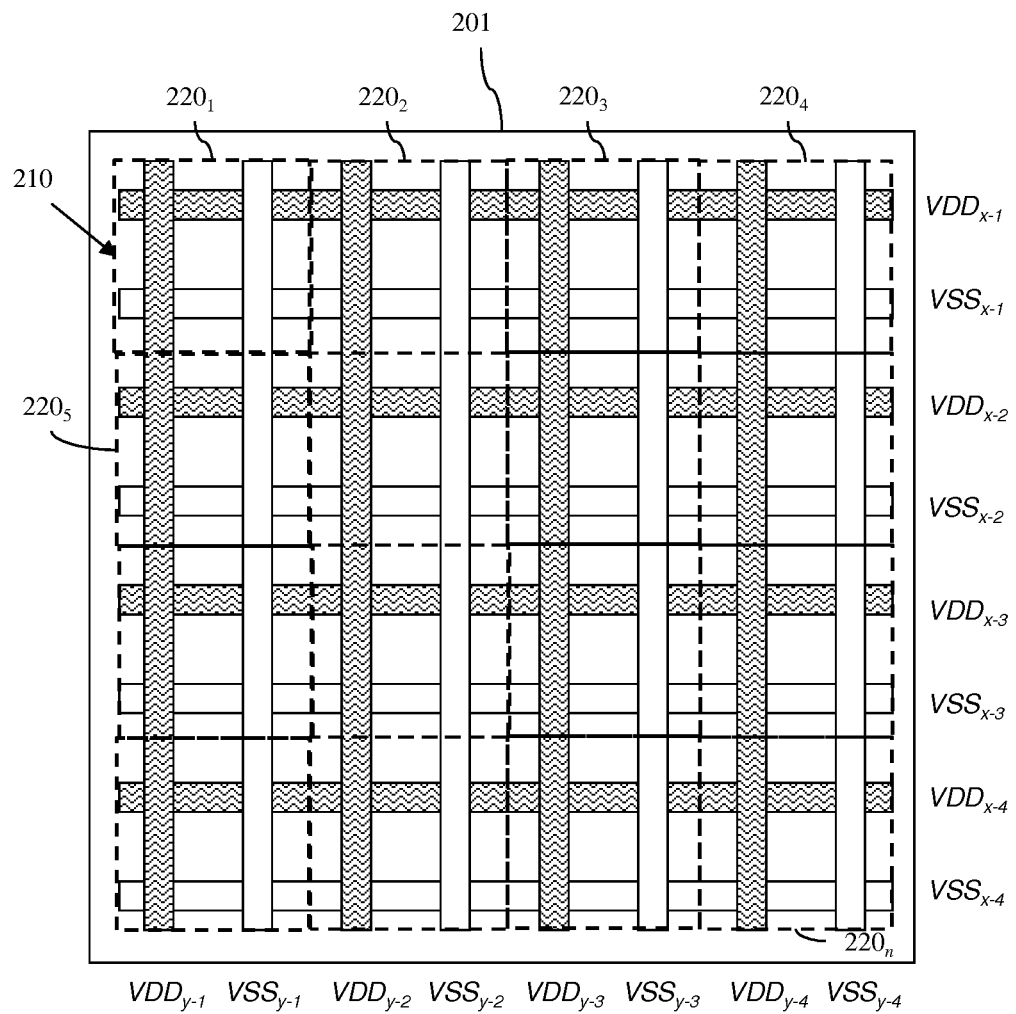
FIG. 3 is a top view diagram illustrating the exemplary initial PDN of FIG. 2 as divided into multiple sections at process 110 of FIG. 1.

The initial PDN 210 can then be divided, for purposes of design, into multiple sections $220_{1-n}$, as shown in FIG. 3 (110). The sections $220_{1-n}$ can, for example, be arranged as a grid with one or more rows and one or more columns of the sections. The size and, particularly, the area of each of the sections $220_{1-n}$ can be essentially the same (i.e., each of the sections $220_{1-n}$ can have essentially the same specific size) (e.g., 1 mm$^2$, 2 mm$^2$, etc.). For purposes of illustration, the initial PDN 210 is shown as being divided into a 4×4 grid and, thus, a total of 16 sections. However, FIG. 3 is not intended to be limiting and it should be understood that the initial PDN 210 can, alternatively, be divided into any number of same size sections. Since the sections $220_{1-n}$ are the same size and the initial PDN 210 is uniform, the sections $220_{1-n}$ will be essentially identical.

Next, a per section total power consumption threshold ($I_t$) can be defined (112). For purposes of this disclosure, a per section total power consumption threshold ($I_t$) refers to a maximum total allowable power consumption amount that can be supported by any one of the essentially identical sections $220_{1-n}$ of the initial PDN 210 having the specific size. This threshold will be the same for all sections because, at this point in the design process, the sections are essentially identical. This per section total power consumption threshold ($I_t$) can be specified, for example, in microwatts per an area amount equal to the size of the sections. For example, if the sections are 1 mm² in size, the per section total power consumption threshold ($I_t$) can be define in μW/mm² (e.g., 3 μW/mm², 4 μW/mm², etc.). For example, if the sections are 2 mm² in size, the per section total power consumption threshold ($I_t$) can be define in terms of μW/2 mm² (e.g., 6 μW/2 mm², 8 μW/2 mm², etc.). In any case, the optimal value for this per section total power consumption threshold ($I_t$) can, for example, be determined based on an electromigration current limit for the sections $220_{1-n}$ of the initial PDN 210. The EM current limit can be determined, for example, based on Black's equation and using both generic metal information (e.g., wire width, wire thickness, and wire length) acquired from the technology file and specific metal information associated with each section (e.g., the amount of wire in each section) from the design specifications. Those skilled in the art will recognize that each technology displays EM sensitivity (i.e., a sensitivity to EM fails) based on the composition of the metal used and on the cross sectional area of the wires. This EM sensitivity will vary as a function of temperature. For a given metal cross section at a particular temperature, an EM current limit can be defined and this EM current limit is a current threshold below which EM of metal ions in the wires will not occur and above which EM of metal ions in the wires will occur. The per section total power consumption threshold ($I_t$) can then be defined based on this EM current limit. For example, the per section total power consumption threshold ($I_t$) can be defined so that it is equal to the EM current limit. Alternatively, the per section total power consumption threshold ($I_t$) can be defined pessimistically. For example, the per section total power consumption threshold ($I_t$) can be defined so that it has a smaller value than the EM current limit and, particularly, so that its value is some percentage (e.g., 95%, 90%, 85%, etc.) of the EM current limit. Alternatively, any other suitable means for determining an optimal per section total power consumption threshold ($I_t$) could be used.

Figure 4:
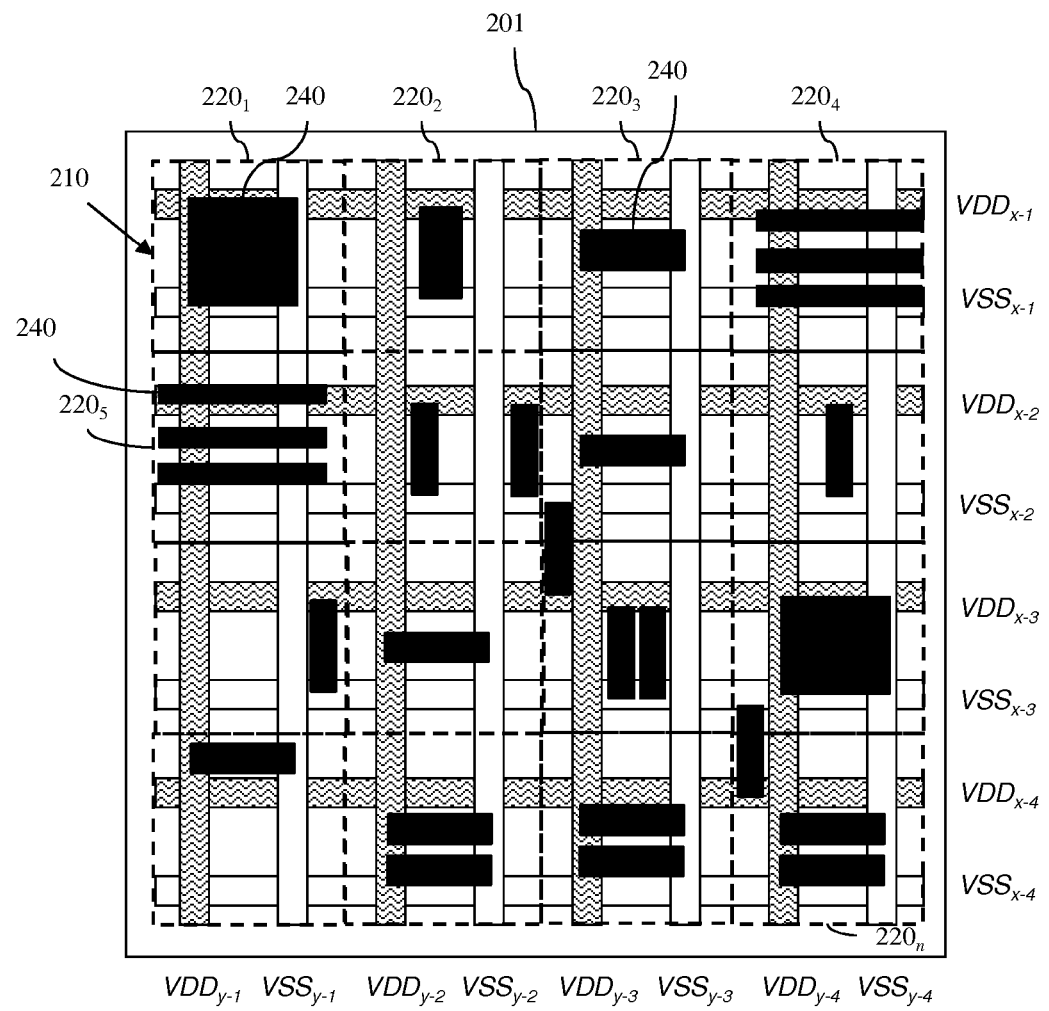
FIG. 4 is a top view diagram illustrating placement of library elements relative to the multiple sections of the initial PDN at process 114 of FIG. 1.

Then, placement of library elements 240 (e.g., standard cells, memories, core processors, etc.), which were previously selected as discussed above, can be established relative to the multiple sections 2201-n of the initial PDN 210, as shown in FIG. 4 (114). This placement process can, for example, be a timing optimized process performed according a library element placement rule deck. That is, the library files for the library elements can, as discussed above, contain timing information for the library elements and the library elements can be placed at process 114 considering this timing information to avoid violation of any timing requirements in the IC. Techniques for performing timing optimized library element placement are well known in the art and, thus, the details of this particular aspect of the placement process are omitted from the specification in order to allow the reader to focus on the salient aspects of the disclosed methods.

Following placement of the library elements at process 114, a customized PDN for the IC can be established on a section-by-section basis to avoid any potential hotspots by determining, for each section $220_{1-n}$, a total power consumption amount ($I_{1-n}$) and, when the total power consumption amount for a particular section is greater than the per section total power consumption threshold ($I_t$), customizing that particular section (116). Specifically, the customizing process can be performed so that the particular section can handle the additional current. That is, it can be performed to increase the maximum total allowable power consumption amount that can be supported by the particular section (as compared to the maximum total allowable power consumption amount that can be supported by non-customized sections) and, thereby to avoid an increase in temperature that would otherwise occur in the particular section due to its relatively high total power consumption amount. As a result, customization of the particular section eliminates a potential hotspot.

Figure 5:
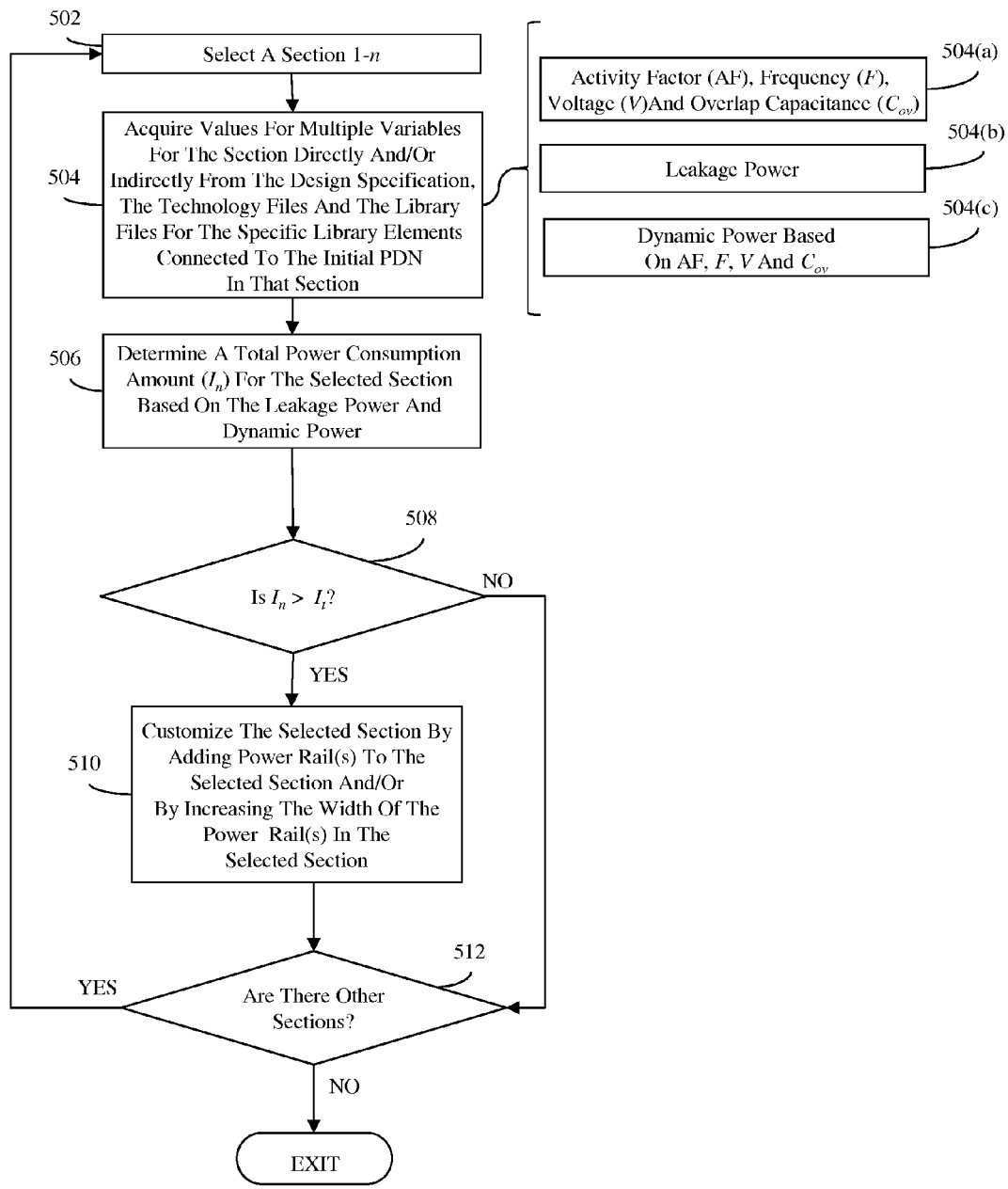
FIG. 5 is a flow diagram illustrating, in greater detail, process steps that can be used to establish a customized PDN, on a section-by-section basis, at process 116 of FIG. 1.

More specifically, FIG. 5 is a flow diagram further illustrating exemplary process steps that can be used to establish the customized PDN, on a section-by-section basis, at process 116. A first section of the initial PDN 210 can be selected (502) and individually processed to determine whether customization of that particular section of the PDN is required.

That is, for the selected section $220_{1-n}$, values for multiple variables can be acquired directly and/or indirectly using the technology files, the design specifications and the library files for the specific library elements placed in that section (504). These variables can include, but are not limited to the following: an activity factor (AF), a switching frequency (F), a voltage (V), an overlap capacitance ($C_{ov}$) for the section (504(a)); a leakage power amount for the section (504(b)); and a dynamic power amount for the section (504(c)).

The activity factor (AF), switching frequency (F), and voltage (V) values will be the same for each section associated with a given net and can be acquired from the design specifications. Those skilled in the art will recognize that the AF is an indication of how active the net will be given the performance requirements for the net and is typically expressed in the design specifications as a percentage of time that the net is active. Additionally, the AF correlates to the switching frequency (F) of the net or, more particularly, the frequency at which switching of devices occurs within the net. The voltage (V) is typically preset in order to meet specific performance requirement(s). The overlap capacitance ($C_{ov}$) for the net can be acquired from the library files and refers to the internal capacitance of the library element including the capacitance of gate to source overlap, gate to drain overlap, and library element metal capacitance.

The leakage power amount for the section can be determined, for example, based on FETWIDTH amounts for the various different VT-type transistors in the section and leakage models for the different VT-type transistors. Specifically, those skilled in the art will recognize that each of the various different VT-type transistors in section will have a different leakage per area of the device. Thus, in order to determine the overall leakage power amount for the section, FETWIDTH amounts for each of the different VT-type transistors in the section should first be determined. For each specific VT-type transistor in the section, a FETWIDTH amount can be determined as the sum of the area within the section of all transistors of that specific VT-type. Next, leakage amounts corresponding to the different VT-type transistors in the section should be determined. Each leakage amount corresponding to a specific VT-type transistor in the section can be calculated by multiplying the FETWIDTH amount for that specific VT-type transistor by the expected leakage for that specific VT-type transistor (given the leakage model) at a particular temperature and voltage. Then, the total leakage amount for the section can be calculated as the sum of the leakage amounts for the various different VT-type transistors in the net. Information indicating the different VT-type transistors and areas of those transistors in each library element in the section can be acquired from the library files for those library elements. The leakage models for the different VT-type transistors can be acquired from the .lib file.

The dynamic power (also referred to herein as the active power) for the section can subsequently be determined based on the previously determined values for the AF, F, V and $C_{ov}$ using the following equation:

$$\text{Dynamic Power} = AF * V^2 * C_{ov} * F, \quad (1)$$

where, as mentioned above, AF refers to the activity factor for the net, V represents a voltage value, $C_{ov}$ represents an overlap capacitance value and where F represents the frequency at which switching of devices occurs within the net.

Next, the total power consumption amount ($I_{1-n}$) for the selected section $220_{1-n}$ can be determined (506). Specifically, the total power consumption amount ($I_{1-n}$) for the selected section $220_{1-n}$ can be calculated as the sum of the previously calculated amounts for the leakage power for the selected section $220_{1-n}$ and the dynamic power for the selected section $220_{1-n}$ at the maximum temperature and voltage allowed for that section, as used within the IC.

In order to determine whether the selected section $2201$-$n$ requires customization, the total power consumption amount ($I_{1-n}$) for the selected section can be compared to the per section total power consumption threshold ($I_t$) (508). When the total power consumption amount ($I_{1-n}$) for the selected section $220_{1-n}$ is less than or equal to the per section total power consumption threshold ($I_t$), no customization of the selected section is required. In this case, a determination can be made as to whether or not there are any other sections that require processing (512) and, if so, another section of the initial PDN 210 can be selected and processes (504)-(508) can be repeated. However, when the total power consumption amount ($I_{1-n}$) for the selected section $220_{1-n}$ is greater than the per section total power consumption threshold ($I_t$), a hotspot is indicated and the selected section $220_{1-n}$ can be customized to handle additional current in that section (i.e., to limit temperature increases due to a relatively high total power consumption amount in that section), to eliminate the potential hotspot and, thereby to avoid any EM or voltage drop issues within that section (510). Thus, for example, if the sections are 1 mm² in size and the per section total power consumption threshold ($I_t$) is defined as 4 µW/mm², then a selected section having a total power consumption amount of, for example, 1 µW/mm² would not require customization, but a selected section having a total power consumption amount of, for example, 5 µW/mm² would require customization.

As mentioned above, the process of customizing a selected section should be performed in order to improve the ability of the selected section to handle the total power consumption ($I_{1-n}$), which was previously determined for that selected section $220_{1-n}$, so that each of the multiple sections exhibits an operating temperature that is less than a predetermined threshold temperature. This can be accomplished by adding one or more additional power rails in one direction (e.g., the x-direction) or in multiple directions (e.g., the x and y-directions), see the exploded views of customized sections shown in FIGS. 6A and 6B. Alternatively, this can be accomplished by increasing the widths of one or more additional power rails in one direction (e.g., the x-direction) or in multiple directions (e.g., the x and y-directions), see the exploded views of customized sections shown in FIGS. 6C and 6D. Alternatively, this can be accomplished by a combination of adding additional power rail(s) in one or both directions and increasing the widths of the power rail(s) in one or both directions, see the exploded views of customized sections shown in FIGS. 6E and 6F. Those skilled in the art will recognize that adding additional metal to a customized section of the PDN (e.g., either by increasing the width of power rail(s) and/or by adding additional power rail(s)) effectively increases the maximum total allowable power consumption amount that can be supported by that customized section (as compared to the maximum total allowable power consumption amount that can be supported by non-customized sections) and, particularly, increases the amount of current that can pass through that customized section section without subjecting it to a rise in temperature above the predetermined threshold temperature.

Figure 7:
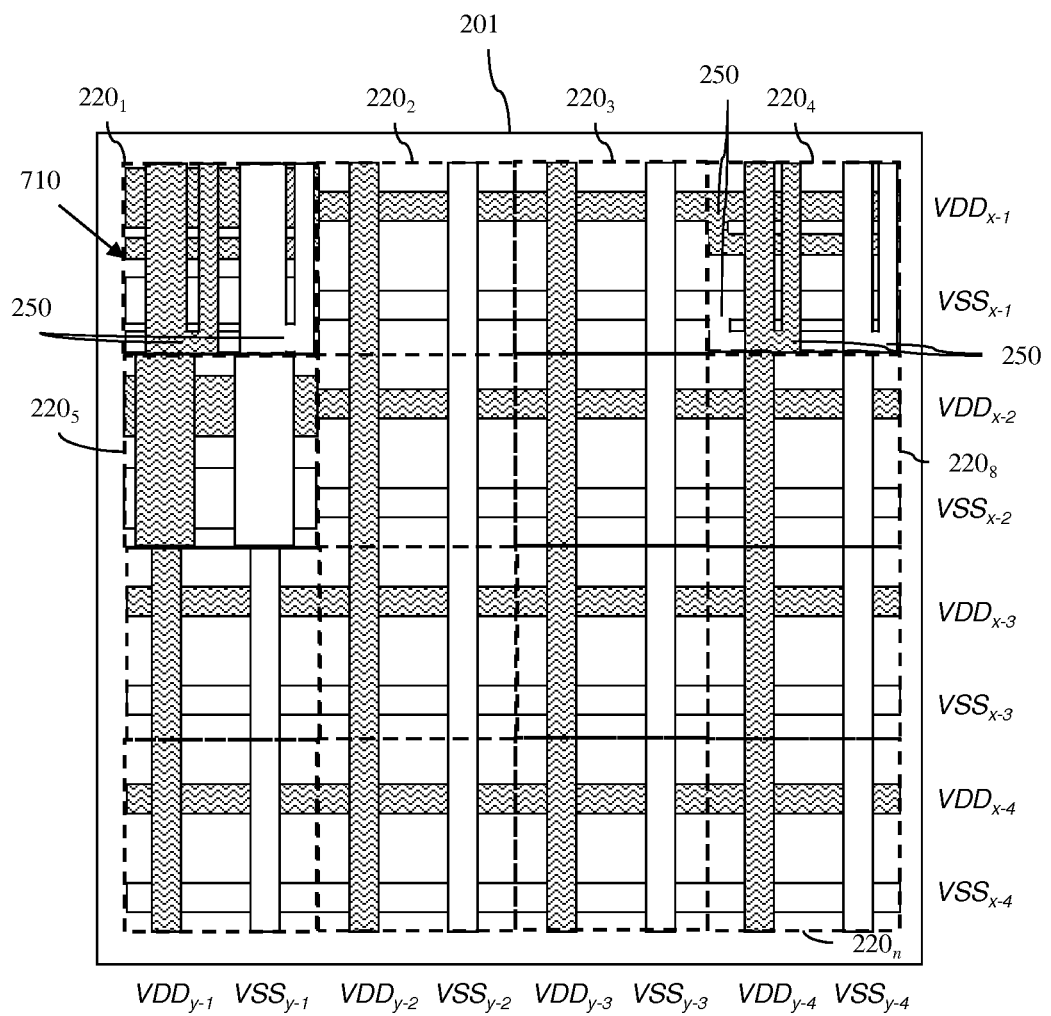
FIG. 7 is a top view diagram illustrating an exemplary customized PDN.

Once customization of the selected section $220_{1-n}$ has been performed at process 510, a determination can be made as to whether or not there are any other sections that require processing (512) and, if so, another section of the initial PDN 210 can be selected and the processes described above can be repeated. Once all sections $220_{1-n}$ have been processed and customized, as necessary, the customized PDN will be complete. FIG. 7 is a drawing illustrating an exemplary customized PDN 710, wherein multiple sections (e.g., sections $220_1$, $220_4$ and $220_5$) have been customized, as described above. As illustrated, any additional power rails added to one section (e.g., section $220_1$ or $220_4$), but not required in an adjacent section, would be merged back into the power rails (e.g., by interconnects 250) at the interface between the two sections (e.g., see the interface between sections $220_1$ and $220_5$ and the interfaces between section $220_4$ and sections $220_5$ and $220_8$).

It should be noted that the order of the process steps described above is provided for illustration purposes only and is not intended to be limiting. For example, alternatively, the total power consumption amounts ($I_{1-n}$) for all of the sections $220_{1-n}$ can be determined, prior to determining whether any individual section requires customization.

Referring again to FIG. 1, following establishment of the customized PDN at process 116, clock planning for the IC can be performed. That is, a clock distribution network (CDN) (e.g., a clock tree) can be synthesized. A CDN is a network of wires and clock cells that distribute clock signals to all of the clocked elements in the IC and a CDN can be synthesized, for example, according to a clock planning rule deck.

After the CDN is synthesized, a wire routing process can be performed (118). Specifically, wires that electrically connect the different library elements and, if applicable, any customized functional blocks in the IC can be added to the design layout given the placement of the different library elements, etc. Wire routing can, for example, be performed according to a wire routing rule deck. This addition of the connecting wires essentially completes the design layout.

Once the design layout is completed, various verification processes can be performed. For example, a timing and signal integrity verification process can be performed (120). That is, timing and signal integrity analyses can be performed on the design layout in order to determine whether it meets various timing specifications and whether all functional and delay violations due to noise are eliminated. If the design layout fails to meet predetermined timing and signal integrity verification requirements, the design must be reworked starting back at process 104 with floorplanning (122). A physical verification process can also be performed (124). That is, the design layout can be checked to see whether it meets design rules, whether it is consistent with the original schematic (i.e., whether it passes a layout versus schematic (LVS) check), etc. If the design layout fails to meet predetermined physical verification requirements, the design must be reworked again starting back at process 104 with floorplanning (126). An electromigration fails and voltage drop (also referred to in the art as IR drop) verification process can also be performed (128). Although the process of customizing the PDN is temperature-aware to avoid hotspots and, thereby EM and IR drop issues, this verification process should be performed for confirmation purposes. As mentioned above, EM is generally understood to be the movement of metal ions due to an electric field. This movement of metal ions can cause cause voids within and/or shorts between the wires and vias that make up the various interconnect networks, including the power delivery network (also referred to as the power bus), on an IC. IR drop refers to a voltage drop across an interconnect network (e.g., a PDN), and which can result in slower switching speeds and lower noise margins and, thereby result in functional failures. Testing for EM fails and/or unacceptable IR drops can be performed, for example, through simulation. If the design layout fails to meet predetermined EM and IR drop verification requirements, the design can be reworked, starting with performing library element placement (130). That is, the following processes can be iteratively repeated: establishing placement of the library elements, establishing the customized PDN, wire routing, performing the timing and signal integrity verification, performing the physical verification process, and performing EM and IR drop verification.

Once the design layout passes all of the above-described verification processes, the final IC design layout can be generated, stored in memory and IC chips can be manufactured according to the final IC design layout (132).

Figure 8:
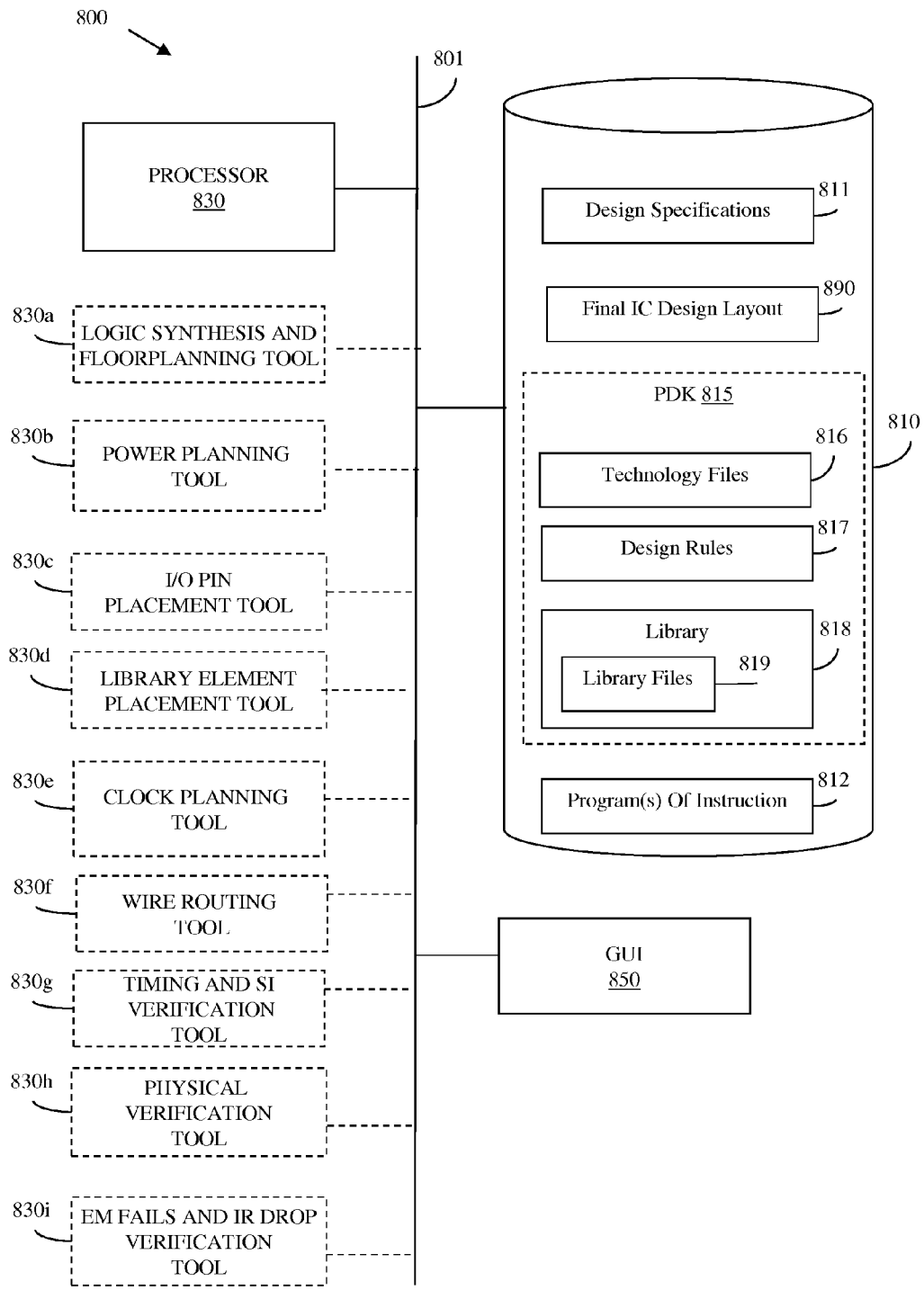
FIG. 8 is a schematic diagram illustrating a temperature-aware integrated circuit (IC) design system.

Referring to FIG. 8, also disclosed herein are temperature-aware integrated circuit (IC) design systems 800. Each design system 800 can be a computer-aided design (CAD) system and, specifically, can incorporate at least one memory 810 (e.g., at least one computer readable storage medium, such as a computer readable storage device), a user interface 850 (e.g., a graphic user interface (GUI)) and at least one processor (e.g., 830 or 830a-i, see detailed discussion below). Components of the design system 800, including the processor(s), memory(ies) and GUI, can be interconnected over a system bus 801, as illustrated. Alternatively, any one or more of the components of the system 800 can communicate with any other component over a wired or wireless network.

The memory 810 can store program(s) 812 of instruction (e.g., electronic design automation (EDA) tool(s)) for performing the various design processes described in detail below. The memory 810 can further store design information, for example, in the form of a process design kit (PDK) 815. This design information (e.g., the PDK 815) can include a set of foundry-specific files including, but not limited to, technology files 816 for a specific technology node, a library element library 818, design rules 817, etc., as discussed in detail above with regard to the method.

As mentioned above, the design system 800 can incorporate at least one processor. Specifically, the design system 800 can incorporate a single specialized processor 830 (e.g., a single specialized computer processing unit) that, during IC design, performs (i.e., that is adapted to perform, that is configured to perform and/or that executes program(s) 812 of instructions to perform) multiple process steps, as described in detail below. Alternatively, the design system 800 can incorporate multiple specialized processors 830a-i (e.g., multiple different specialized computer processing units) and, during IC design, each processor can perform (i.e., can be adapted to perform, can be configured to perform and/or can execute one or more specific programs 812 of instructions to perform) one or more of the multiple process steps, as described in detail below. For purposes of illustration, nine different special purpose processor(s) referred to as tools are shown in FIG. 8 including a logic synthesis and floorplanning tool 830a, a power planning tool 830b, a I/O pin placement tool 830c, a library element placement tool 830d, a clock planning tool 830e, a wiring routing tool 830f, a timing and signal integrity verification tool 830g, a physical verification tool 830h and an electromigration fails and voltage drop (also referred to in the art as IR drop) verification tool 830i. It should be understood that FIG. 8 is not intended to be limiting and, alternatively, the multiple process steps, as described in detail below, can be performed by any number of one or more processors.

The design system 800 can receive (e.g., can be adapted to receive, can be configured to receive, etc.) design inputs for an IC in a specific technology node (e.g., design specifications 811). These design inputs can be received, for example, from a designer via the graphic user interface (GUI) 850. Using the GUI 850, the designer can develop an initial design for the IC. This initial design can be represented by a high-level description, which sets out the requirements for the IC chip. This high-level description can be stored in the memory 810 in, for example, a hardware description language (HDL), such as VHDL or Verilog. Those skilled in the art will recognize that this high-level description will set out specifications for various parameters (e.g., for channel length, channel width, doping, spacer width, etc.).

The processor 830 (or, if applicable, one or more of the processors 830(a)-(i)) can access and use (i.e., can be adapted to access and use, can be configured to access and use, can execute program(s) 812 of instructions to access and use, etc.) the technology files 816, the design specifications 811 and the library files 819 early in the design process in order to, in a timely manner, generate and store in memory 810 a final IC design layout 890 that can be used to manufacture IC chips that exhibit minimal hotspots and, thereby minimal EM fails for improved IC reliability.

Specifically, the processor 830 (or, if applicable, the logic synthesis and floorplanning tool) can perform (i.e., can be adapted to perform, can be configured to perform, can execute a program of instructions 512 to perform, etc.) logic synthesis and floorplanning. During logic synthesis, the high-level description can be synthesized into a gate-level netlist, which describes the connectivity of the IC in terms of nets. In library element-based design, the high-level description can be synthesized into the netlist using library elements selected from the library element library. During floorplanning, the size of the IC chip, the placement of customized functional blocks, the placement of the area(s) for library elements, etc. can be determined.

The processor 830 (or, if applicable, the power planning tool 830b) can perform (i.e., can be adapted to perform, can be configured to perform, can execute a program of instructions 512 to perform, etc.) initial power planning for the IC. Specifically, during initial power planning, the power requirements for the IC can be estimated (e.g., based on the design specifications) and an initial power delivery network (PDN) (also referred herein as a power bus or grid) for the IC can be established for the IC based on the power requirements, the floorplan, and on information contained in the technology files regarding the metal layers used in the specific technology node (e.g., the wire material, wire width, wire thickness, wire length, etc.). As shown in FIG. 2, this initial PDN 210 can be a uniform PDN with power rails arranged for uniformly distributing power across the IC 201. Specifically, the initial PDN 210 can incorporate uniformly spaced power rails having the same width and arranged in a pattern with alternating positive power supply (VDD) and ground (VSS) power rails (i.e. alternating wires electrically connected to VDD and VSS) running in a first direction (e.g., the x-direction) across the full width of the IC 201 and overlaying or overlaid by alternating VDD and VSS power rails running in a second direction (e.g., the y-direction) across the full length of the IC 201.

The processor 830 (or, if applicable, the input/output pin placement tool 830c) can perform (i.e., can be adapted to perform, can be configured to perform, can execute a program of instructions 812 to perform, etc.) input/output (I/O) pin placement. Specifically, the I/O pads and buffers can be placed based on the floorplan and the design of the initial PDN. Such I/O pin placement can, for example, be performed according an I/O pin placement rule deck. Techniques for I/O pin placement are well known in the art and, thus, the details of the I/O pin placement process are omitted from this specification in order to allow the reader to focus on the salient aspects of the disclosed system.

Next, the processor 830 (or, if applicable, the power planning tool 830b) can divide (i.e., can be adapted to divide, can be configured to divide, can execute a program of instructions 812 to divide, etc.) the initial PDN 210 into multiple sections $220_{1-n}$, as shown in FIG. 3. The sections $220_{1-n}$ can, for example, be arranged as a grid with one or more rows and one or more columns of the sections. The size and, particularly, the area of each of the sections $220_{1-n}$ can be essentially the same (i.e., each of the sections $220_{1-n}$ can have essentially the same specific size) (e.g., 1 mm², 2 mm², etc.). For purposes of illustration, the initial PDN 210 is shown as being divided into a 4×4 grid and, thus, a total of 16 sections. However, FIG. 3 is not intended to be limiting and it should be understood that the initial PDN 210 could, alternatively, be divided into any number of same size sections. Since the sections $220_{1-n}$ are the same size and the initial PDN 210 is uniform, the sections $220_{1-n}$ will be essentially identical.

Next, the processor 830 (or, if applicable, the power planning tool 830b) can define a per section total power consumption threshold ($I_t$). As discussed in detail above with regard to the method, a per section total power consumption threshold ($I_t$) refers to a maximum total allowable power consumption amount that can be supported by any one of the essentially identical sections $220_{1-n}$ of the initial PDN 210 having the specific size. This per section total power consumption threshold ($I_t$) can be specified, for example, in microwatts per an area amount equal to the size of the sections. The optimal value for this per section total power consumption threshold ($I_t$) can, for example, be determined based on an electromigration current limit for the sections $220_{1-n}$ of the initial PDN 210. Alternatively, any other suitable means for determining an optimal per section total power consumption threshold ($I_t$) could be used.

The processor 830 (or, if applicable, the library element placement tool 830d) can also establish placement (e.g., can be adapted to establish placement, can be configured to establish placement, can execute a program of instructions 812 to establish placement, etc.) of the library elements relative to the multiple sections $220_{1-n}$ of the initial PDN 210, as shown in FIG. 4. This placement process can be performed such that placement of the library elements is timing optimized. That is, the library files can, as discussed above, contain timing information for the library elements and the library elements can be placed considering this timing information to avoid violation of any timing requirements in the IC. Techniques for performing timing optimized library element placement are well known in the art and, thus, the details of this particular aspect of the placement process are omitted from the specification in order to allow the reader to focus on the salient aspects of the disclosed system.

Following placement of the library elements, the processor 830 (or, if applicable, the power planning tool 830b) can establish (i.e., can be adapted to establish, can be configured to establish, can execute a program of instructions 812 to establish, etc.) a customized PDN for the IC. As discussed in detail above with regard to the flow diagram of FIG. 5, this customized PDN can be established on a section-by-section basis to avoid any potential hotspots by determining, for each section $220_{1-n}$, a total power consumption amount ($I_{1-n}$) and, when the total power consumption amount for a particular section is greater than the per section total power consumption threshold ($I_t$), customizing that particular section. Specifically, the processor can customize the particular section so that the particular section can handle the additional current. That is, the processor can customize the particular section to increase the maximum total allowable power consumption amount that can be supported by the particular section (as compared to the maximum total allowable power consumption amount that can be supported by non-customized sections) and, thereby to avoid an increase in temperature that would otherwise occur in the particular section due to its relatively high total power consumption amount. As a result, customization of the particular section eliminates a potential hotspot and, in the customized PDN, each of the multiple sections exhibits an operating temperature that is less than a predetermined threshold temperature.

Figure 6A:
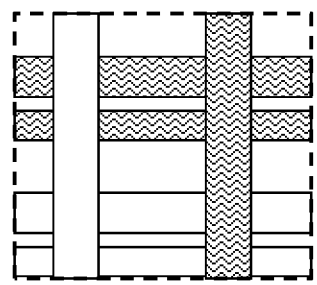
FIGS. 6A-6F are exploded views of customized section that illustrate various different techniques for customizing a section of the PDN at process 510 of FIG. 5.
Figure 6B:
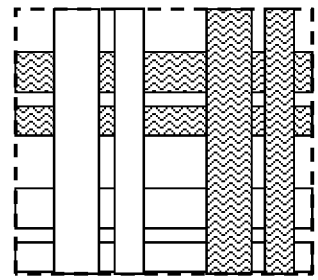
Figure 6C:
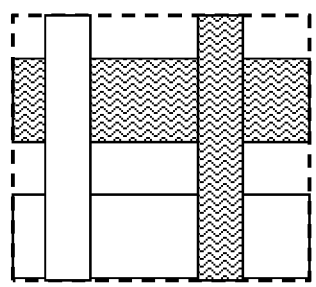
Figure 6D:
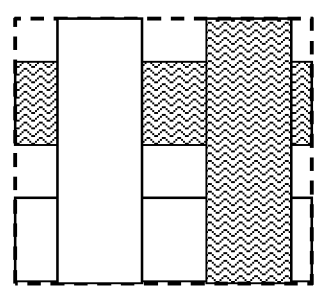
Figure 6E:
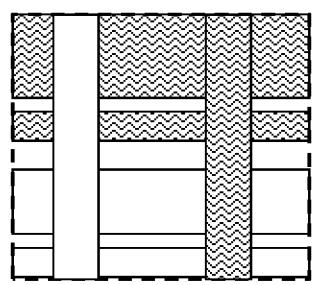
Figure 6F:
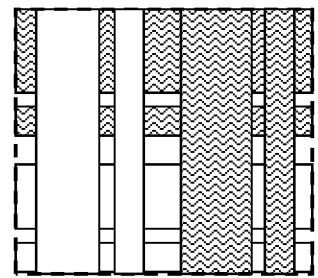

Customization of a particular section can be accomplished by adding one or more additional power rails in one direction (e.g., the x-direction) or in multiple directions (e.g., the x and y-directions), see the exploded views of customized sections shown in FIGS. 6A and 6B. Alternatively, this can be accomplished by increasing the widths of one or more additional power rails in one direction (e.g., the x-direction) or in multiple directions (e.g., the x and y-directions), see the exploded views of customized sections shown in FIGS. 6C and 6D. Alternatively, this can be accomplished by a combination of adding additional power rail(s) in one or both directions and increasing the widths of the power rail(s) in one or both directions, see the exploded views of customized sections shown in FIGS. 6E and 6F. FIG. 7 is a drawing illustrating an exemplary customized PDN 710, wherein multiple sections (e.g., sections $220_1$, $220_4$ and $220_5$) have been customized, as described above. As illustrated, any additional power rails added to one section (e.g., section $220_1$ or $220_4$), but not required in an adjacent section, would merged back into the power rails (e.g., by interconnects 250) at the interface between the two sections (e.g., see the interface between sections $220_1$ and $220_5$ and the interfaces between section $220_4$ and sections $220_5$ and $220_8$). Those skilled in the art will recognize that adding additional metal to a customized section of the PDN (e.g., either by increasing the width of power rail(s) and/or by adding additional power rail(s)) effectively increases the maximum total allowable power consumption amount that can be supported by that customized section (as compared to the maximum total allowable power consumption amount that can be supported by non-customized sections) and, particularly, increases the amount of current that can pass through that customized section section without subjecting it to a rise in temperature above the predetermined threshold temperature.

The processor 830 (or, if applicable, the clock planning tool 830e) can perform (i.e., can be adapted to perform, can be configured to perform, can execute a program of instructions 512 to perform, etc.) clock planning for the IC. That is, a clock distribution network (CDN) (e.g., a clock tree) can be synthesized.

The processor 830 (or, if applicable, the wire routing tool 830f) can perform (i.e., can be adapted to perform, can be configured to perform, can execute a program of instructions 812 to perform, etc.) a wire routing process. Specifically, wires that electrically connect the different library elements in the IC can be added to the design layout given the placement of those different library elements. Wire routing can, for example, be performed according to a wire routing rule deck. This addition of the connecting wires essentially completes the design layout.

The processor 830 (or, if applicable, the wire routing tool 830f) can perform (i.e., can be adapted to perform, can be configured to perform, can execute a program of instructions 812 to perform, etc.) a wire routing process. Specifically, wires that electrically connect the different library elements and, if applicable, customized functional blocks in the IC can be added to the design layout given the placement of those different library elements, etc. Wire routing can, for example, be performed according to a wire routing rule deck. This addition of the connecting wires essentially completes the design layout.

The processor 830 (or, if applicable, verification tools 830g-830i) can perform (i.e., can be adapted to perform, can be configured to perform, can execute a program of instructions 812 to perform, etc.) various verification processes. For example, the processor 830 (or, if applicable the timing and signal integrity verification tool 830g) can perform timing and signal integrity analyses on the design layout in order to determined whether the design layout meets various timing specifications and whether all functional and delay violations due to noise are eliminated. If the design layout fails to meet predetermined timing and signal integrity verification requirements, the design must be reworked starting with floorplanning. The processor 830 (or, if applicable, the physical verification tool 830h) can check the design layout to see whether it meets design rules, whether it is consistent with the original schematic (i.e., whether it passes a layout versus schematic (LVS) check), etc. If the design layout fails to meet predetermined physical verification requirements, the design must be reworked again starting with floorplanning. The processor 830 (or, if applicable, the EM fails and IR drop verification tool 830i) can test EM fails and IR drops across the network (e.g., through simulations). If the design layout fails to meet predetermined EM and IR drop verification requirements, the design can be reworked starting with establishing library element placement. Once the design layout passes all of the above described verification processes, the processor 830 can generate the final IC design layout 890 and store in in memory so that IC chips can be manufactured according to the final IC design layout 890.

Also disclosed herein is a computer program product for temperature-aware integrated circuit (IC) design. The computer program product can be a computer readable storage medium with program instructions embodied therewith (e.g., stored thereon). These program instructions can be executable by a processor to cause the processor to perform the above-described integrated circuit design method. More specifically, the present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may incorporate copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein is an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which has one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
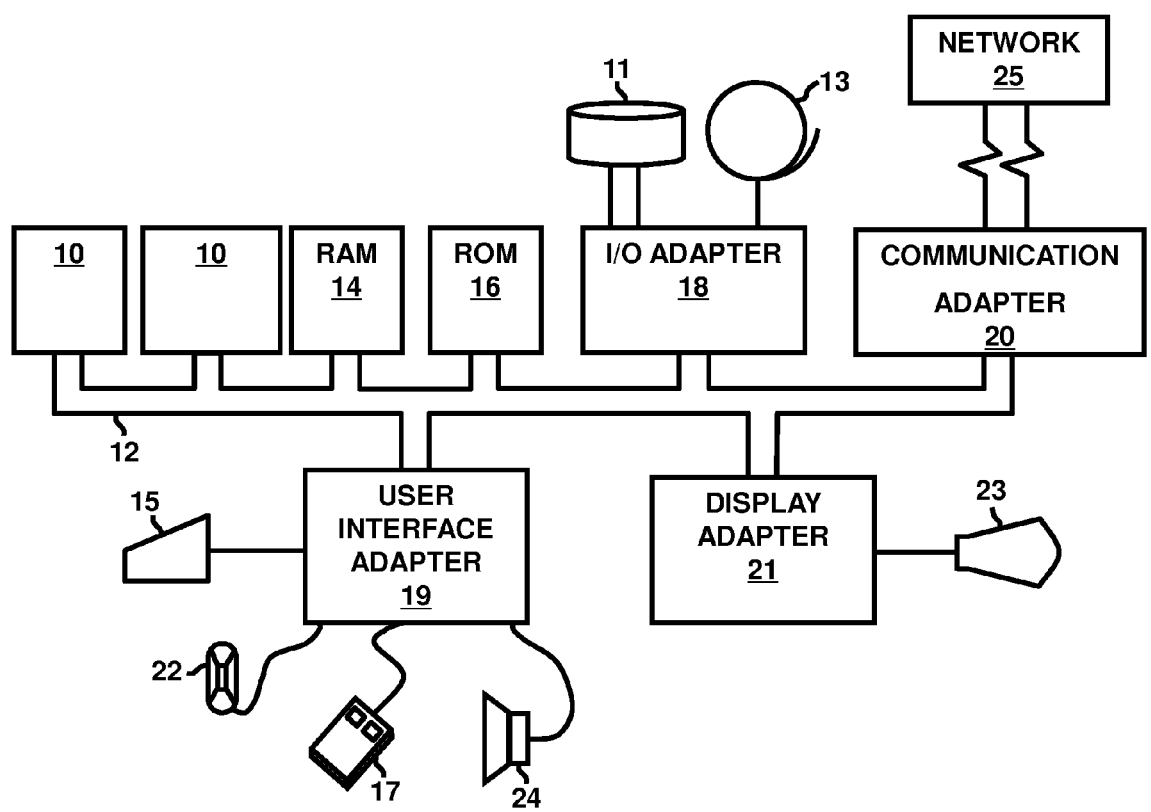
FIG. 9 is a schematic diagram illustrating a representative hardware configuration for implementing the disclosed design methods, systems and computer program products; and, FIG. 10 is a top view diagram illustrating an IC chip structure manufactured according to a final IC design layout generated and output using any of the disclosed methods, systems and computer program products.

A representative hardware environment (i.e., a computer system) for implementing the design methods, systems and computer program products is depicted in FIG. 9. This schematic drawing illustrates a hardware configuration of an information handling/computer system in accordance with the embodiments herein. The system has at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 10:
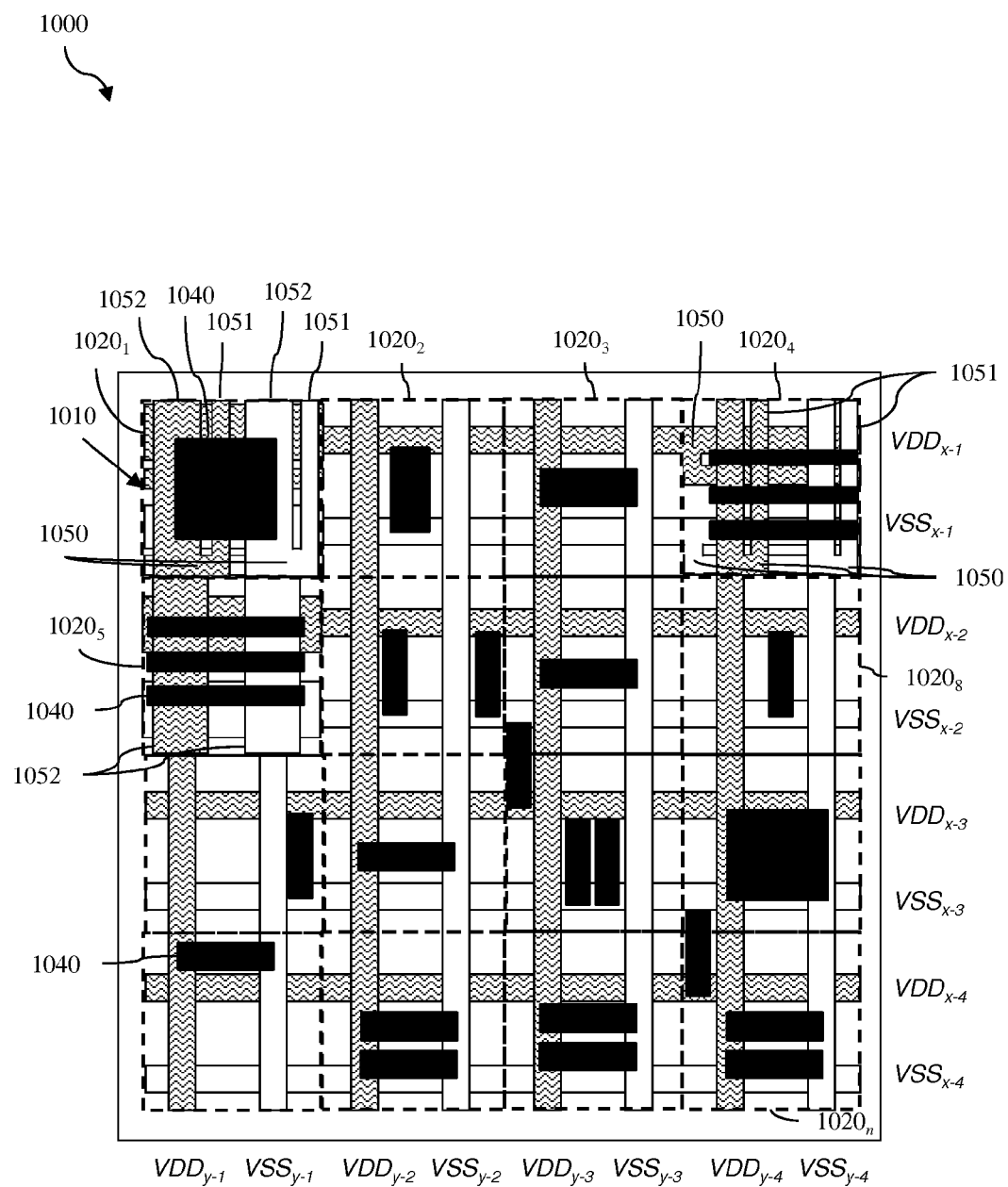

Referring to FIG. 10, disclosed herein is an IC chip structure 1000 manufactured according to a final IC design layout generated and output using the methods, systems or computer program products. Specifically, the IC chip 1000 can have devices 1040, which are associated with various library elements (e.g., standard cells, core processors, memories, etc.) placed as described above. The IC chip 1000 can further have a power delivery network (PDN) and, particularly, a customized PDN network 1010 established for the devices 1040 as described above.

The customized PDN 1010 can, for the most part, be a uniform PDN with power rails arranged for uniformly distributing power across the IC chip 1000. Specifically, the customized PDN 1010 can incorporate uniformly spaced power rails having the same width and arranged in a pattern with alternating positive power supply (VDD) and ground (VSS) power rails (i.e. alternating wires electrically connected to VDD and VSS) running in a first direction (e.g., the x-direction) across the full width of the IC 1000 and overlaying or overlaid by alternating VDD and VSS power rails running in a second direction (e.g., the y-direction) across the full length of the IC 201.

The customized PDN 1010 can further be divided into multiple sections $1020_{1-n}$. The sections $1020_{1-n}$ can, for example, be arranged as a grid with one or more rows and one or more columns of the sections. The size and, particularly, the area of each of the sections $1020_{1-n}$ can be essentially the same (i.e., each of the sections $1020_{1-n}$ can have essentially the same specific size) (e.g., 1 mm$^2$, 2 mm$^2$, etc.). For purposes of illustration, the customized PDN 1010 is shown as being divided into a 4×4 grid and, thus, a total of 16 sections. However, FIG. 10 is not intended to be limiting and it should be understood that the customized PDN 1010 could, alternatively, be divided into any number of same size sections. The multiple sections $1020_{1-n}$ can include both first sections and at least one second section (i.e., at least one customized section, such as sections $1020_1$, $1020_4$, and $1020_5$). The first sections (i.e., all sections except the customized sections) can be essentially identical and, particularly, can have essentially the same configuration of power rails. For example, the first sections can have the same number of power rails and those power rails can have the same widths. Each second section (e.g., $1020_1$, $1020_4$, and $1020_5$) can be uniquely different from the first sections and, particularly, can be customized to compensate for factors that could to lead an undesirable amount of power consumption (i.e., a relatively high amount of power consumption as compared to the amount of power consumption in other sections) and, thereby a hotspot. Such factors include, but are not limited to, a relatively high number of devices connected to the PDN 1010 in that section and/or devices with a relatively high switching frequency. That is, each second section (e.g., $1020_1$, $1020_4$, and $1020_5$), which would otherwise exhibit a relatively high amount of power consumption (e.g., due to the number and/or switching frequency of the devices electrically connected to that section), can be customized such that each of the multiple sections $1020_{1-n}$ (including both the first sections and the second sections) has a total power consumption amount that is less than some predetermined amount. For example, a customized section can have additional power rails 1051 in one direction (e.g., the x-direction) or in multiple directions (e.g., the x and y-directions) (see customized section $1020_4$). Alternatively, a customize sections can have relatively wide power rails in one direction (e.g., the x-direction) or in multiple directions (e.g., the x and y-directions), (see customized section $1020_4$). That is, the power rails in the customized section may have greater widths than the power rails in the first sections. Alternatively, a customized section can have a combination of both additional power rail(s) 1051 in one or both directions and wider power rail(s) 1052 in one or both directions (see customized section $1020_1$). As illustrated, any additional power rails added to one section (e.g., section $1020_1$ or $1020_4$), but not required in an adjacent section, merged back into the power rails (e.g., by interconnects 1050) at the interface between the two sections (e.g., see the interface between sections $1020_1$ and $1020_5$ and the interfaces between section $1020_4$ and sections $1020_5$ and $1020_8$). Those skilled in the art will recognize that adding additional metal to a customized section of the PDN (e.g., either by increasing the width of power rail(s) and/or by adding additional power rail(s)) effectively increases the maximum total allowable power consumption amount that can be supported by that customized section (as compared to the maximum total allowable power consumption amount that can be supported by non-customized sections) and, particularly, increases the amount of current that can pass through that customized section section without subjecting it to a rise in temperature above the predetermined threshold temperature. As a result, the operating temperatures across the PDN 1010 and, particularly, in each of the multiple sections $1020_{1-n}$ of the PDN 1010 remain less than the predetermined threshold temperature.

It should be understood that the terminology used herein is for the purpose of describing the disclosed design methods, systems and computer program products and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, disclosed above are temperature-aware integrated circuit (IC) design methods, systems and computer program products, which establish a customized power delivery network (PDN) for an IC early in the design process in order to generate, in a timely manner, a final IC design layout that can be used to manufacture IC chips that will exhibit minimal hotspots for improved IC reliability and functionality. Specifically, during design and prior to placement of library elements, an initial PDN can be established and divided into multiple essentially identical sections. The library elements can then be placed relative to the sections. Next, potential hotspots associated with any of the sections can be identified and a customized PDN for the IC can be established to eliminate the hotspots. That is, for each section, a total power consumption amount can be determined and compared to a per section total power consumption threshold. When the total power consumption amount associated with the sections is greater than the threshold, a hotspot is indicated. In this case, the section can be customized to handle additional current in that section (i.e., to limit temperature increases due to a relatively high total power consumption amount in that section), eliminating the hotspot and, thereby avoiding any EM or voltage drop issues within the section. Also disclosed is a resulting IC chip structure.

What is claimed is:
1. A method comprising:
accessing, from memory, design specifications for an integrated circuit;
based on the design specifications, establishing an initial power delivery network for the integrated circuit and selecting library elements for the integrated circuit;
dividing the initial power delivery network into multiple sections each having a same specific size;
given the specific size, defining a per section total power consumption threshold;
establishing placement of the library elements relative to the multiple sections; and,
establishing a customized power delivery network for the integrated circuit by determining, for each section, a total power consumption amount and, when the total power consumption amount is greater than the per section total power consumption threshold, customizing the section, the customizing of the section being performed so that, within integrated circuit chips manufactured based on a final design layout for the integrated circuit, each of the multiple sections will exhibit an operating temperature that is less than a predetermined threshold temperature, wherein the method further comprises accessing, from the memory, technology files for a specific technology node associated with the integrated circuit and library files for the library elements, wherein the initial power delivery network is established using the design specifications and the technology files, wherein the per section total power consumption threshold is defined based on an electromigration current limit of the initial power delivery network, and wherein the total power consumption amount for each section is determined by performing the following:
  using the design specifications, the technology files and the library elements to determine values for multiple variables, the multiple variables comprising: activity factor; switching frequency; voltage; overlap capacitance; and leakage power;
  determining dynamic power based on the activity factor, the switching frequency, the voltage and the overlap capacitance; and
  determining the total power consumption amount based on the leakage power and the dynamic power.

2. The method of claim 1, the customizing being performed to avoid problems associated with any of temperature-dependent electromigration and voltage drops in the integrated circuit chips.

3. The method of claim 1, the section comprising power rails and the customizing of the section comprising any of adding at least one additional power rail to the power rails in the section and increasing a width of at least one of the power rails in the section.

4. The method of claim 1, the section comprising first power rails having a first width and arranged in a first direction and second power rails overlaying the first power rails, having a second width, and arranged in a second direction perpendicular to the first direction and the customizing of the section comprising any of the following:
  adding at least one additional first power rail to the first power rails in the section;
  adding at least one additional second power rail to the second power rails in the section;
  increasing the first width of at least one of the first power rails; and
  increasing the second width of at least one of the second power rails.

5. The method of claim 1, further comprising:
  after the establishing of the customized power delivery network for the integrated circuit, performing the following processes: a wire routing process, a timing and signal integrity verification process, a physical verification process, and an electromigration and voltage drop verification process;
  if, during the electromigration and voltage drop verification process, electromigration and voltage drop requirements are not met, iteratively repeating the establishing of the placement of the library elements, the establishing of the customized power delivery network, the wire routing process, the timing and signal integrity verification process, the physical verification process, and the electromigration and voltage drop verification process; and,
  when, during the electromigration and voltage drop verification process, the electromigration and voltage drop requirements are met, generating a final design layout for the integrated circuit and manufacturing integrated circuit chips according to the final design layout.

6. The method of claim 1, the library files containing timing information for the library elements and the placement of the library elements being established based on the library files such that the placement of the library elements is also timing optimized.

7. A system comprising:
  a memory storing design specifications for an integrated circuit; and,
  at least one processor in communication with the memory and performing the following:
    accessing the design specifications from the memory and, based on the design specifications, establishing an initial power delivery network for the integrated circuit and selecting library elements for the integrated circuit;
    dividing the initial power delivery network into multiple sections each having a same specific size;
    given the same specific size, defining a per section total power consumption threshold;
    establishing placement of the library elements relative to the multiple sections; and,
    establishing a customized power delivery network for the integrated circuit by determining, for each section, a total power consumption amount and, when the total power consumption amount is greater than the per section total power consumption threshold, customizing the section, the customizing of the section being performed so that, within integrated circuit chips manufactured based on a final design layout for the integrated circuit, each of the multiple sections will exhibit an operating temperature that is less than a predetermined threshold temperature,
  wherein the memory further stores technology files for a specific technology node associated with the integrated circuit and library files for the library elements,
  wherein the initial power delivery network is established by the processor using the design specifications and the technology files,
  wherein the per section total power consumption threshold is defined by the processor based on an electromigration current limit of the initial power delivery network, and
  wherein the total power consumption amount for each section is determined by the processor by performing the following:
    using the design specifications, the technology files and the library elements to determine values for multiple variables, the multiple variables comprising: activity factor; switching frequency; voltage; overlap capacitance; and leakage power;
    determining dynamic power based on the activity factor, the switching frequency, the voltage and the overlap capacitance; and
    determining the total power consumption amount based on the leakage power and the dynamic power.

8. The system of claim 7, the customizing being performed to avoid problems associated with any of temperature-dependent electromigration and voltage drops in the integrated circuit chips.

9. The system of claim 7, the section comprising power rails and the customizing of the section comprising any of adding at least one additional power rail to the power rails in the section and increasing a width of at least one of the power rails in the section.

10. The system of claim 7, the section comprising first power rails having a first width and arranged in a first direction and second power rails overlaying the first power rails, having a second width, and arranged in a second direction perpendicular to the first direction and the customizing of the section comprising any of the following:
adding at least one additional first power rail to the first power rails in the section;
adding at least one additional second power rail to the second power rails in the section;
increasing the first width of at least one of the first power rails; and
increasing the second width of at least one of the second power rails.

11. The system of claim 7, the processor further performing the following:
after the establishing of the customized power delivery network for the integrated circuit,
performing the following processes: a wire routing process, a timing and signal integrity verification process, a physical verification process, and an electromigration and voltage drop verification process;
if, during the electromigration and voltage drop verification process, electromigration and voltage drop requirements are not met, iteratively repeating the establishing of the placement of the library elements, the establishing of the customized power delivery network, the wire routing process, the timing and signal integrity verification process, the physical verification process, and the electromigration and voltage drop verification process; and,
when, during the electromigration and voltage drop verification process, the electromigration and voltage drop requirements are met, generating a final design layout for the integrated circuit and outputting the final design layout for manufacturing.

12. The system of claim 7, the library files containing timing information for the library elements and the placement of the library elements being established by the processor based on the library files such that the placement of the library elements is also timing optimized.

13. An integrated circuit chip structure comprising:
a power delivery network; and
devices electrically connected the power delivery network, the power delivery network having multiple sections with a same specific size, the size being an area amount and the multiple sections comprising first sections that are essentially identical and at least one second section that has a different power rail configuration than the first sections such that operating temperatures in all of the multiple sections remain less than a predetermined threshold temperature.

14. The integrated circuit chip structure of claim 13, the second section having more power rails than the first sections.

15. The integrated circuit chip structure of claim 13, the second section having wider power rails than the first sections.

16. The integrated circuit chip structure of claim 13, the second section having more and wider power rails than the first sections.

* * * * *